June 12, 1928.  A. W. PUFFER  1,673,470
SAFETY VALVE
Filed Dec. 18, 1922
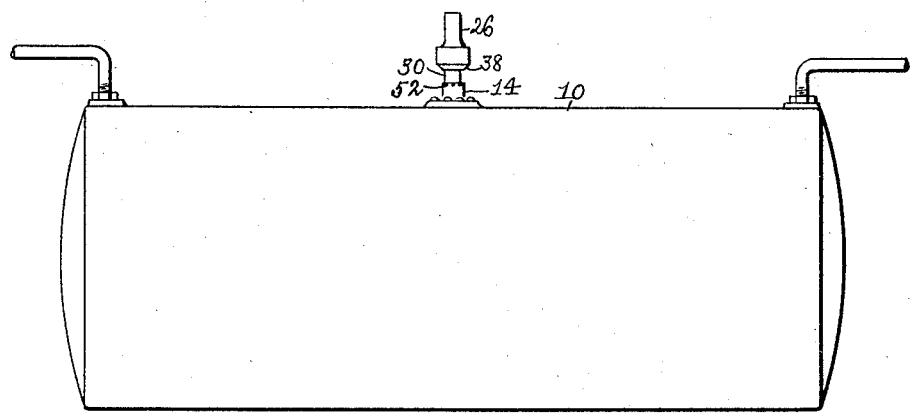
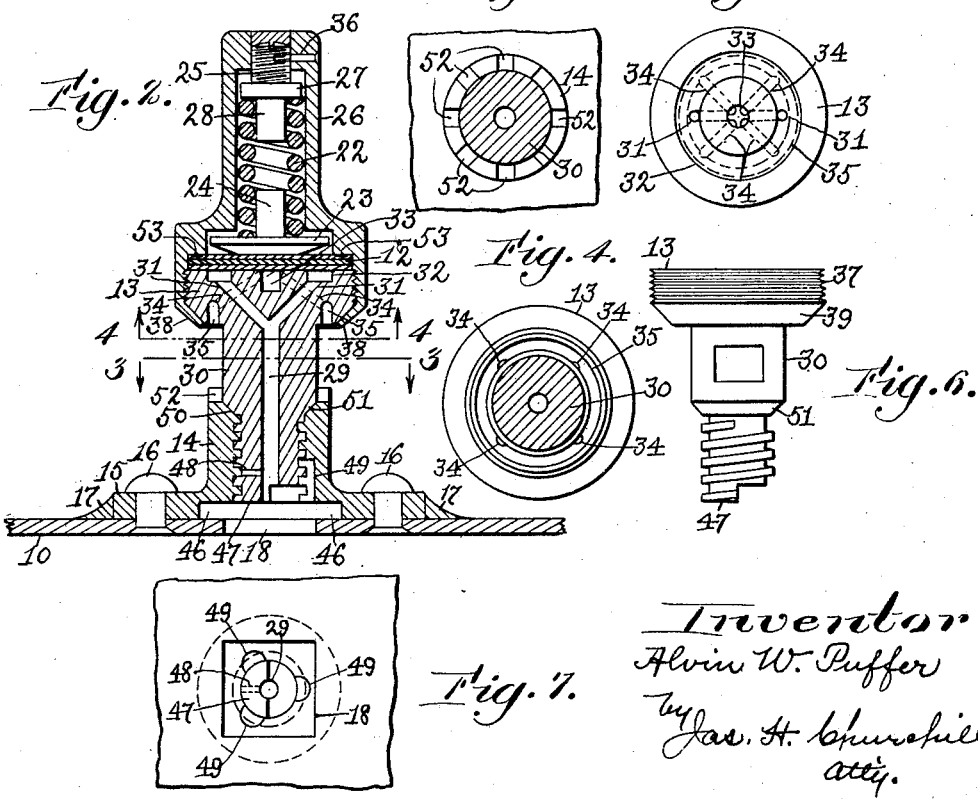
Inventor:
Alvin W. Puffer
by Jas. H. Churchill
atty.

Patented June 12, 1928.

1,673,470

UNITED STATES PATENT OFFICE.

ALVIN W. PUFFER, OF MEDFORD, MASSACHUSETTS, ASSIGNOR TO PUFFER MANUFACTURING COMPANY, OF WINCHESTER, MASSACHUSETTS, A CORPORATION OF MAINE.

SAFETY VALVE.

Application filed December 18, 1922. Serial No. 607,581.

This invention relates to a safety valve for use in connection with vessels containing fluid under pressure.

One object of the invention is to provide a novel and efficient construction of safety valve which may be used to advantage in connection with and form a part of the regular equipment of unfired pressure vessels, such as compressed air tanks and the like, and which furthermore is of such construction as to prevent tampering with the valve controlling or adjusting mechanism, thereby preventing alteration of the pressure for which the valve is set to operate after the valve has been installed in the tank or vessel.

Another object of the invention is to provide a construction of safety valve which eliminates or at least reduces to a minimum, in the event that the valve has become defective or worn so as to leak, the possibility of plugging the safety valve and using the same in the tank or vessel as a mere plug when its external appearance is such as to give no warning to an inspector that it is in fact defective or inoperative.

Provision is also made for likewise eliminating or at least reducing to a minimum the possibility of plugging up the spud or opening in the tank in which the valve is normally received.

These and other features of the invention will be hereinafter described and particularly pointed out in the claims.

In the drawing illustrating the preferred form of the invention, Fig. 1 represents in elevation an unfired pressure vessel such as a compressed air tank provided with a safety valve embodying this invention; Fig. 2 a vertical section of the improved safety valve and valve spud; Fig. 3, a cross section on line 3—3, Fig. 2 viewed in the direction of the arrows; Fig. 4 a cross section on line 4—4; Fig. 5, a plan and Fig. 6 an elevation of the seat member shown in Fig. 2, and Fig. 7, an underside view of the seat member.

Referring to the drawing, 10 represents a tank or vessel adapted to contain fluid under pressure, such for example, as compressed air. The tank or vessel 10 is provided with the improved safety valve, preferably made as shown and comprising a valve proper 12, a seat member 13, which is preferably screwed into a spud 14 having a base 15 secured by rivets 16 and solder 17 or in other suitable manner, to the body of the tank 10 in position so that the threaded hole in the spud 14 is in substantial alignment with a hole 18 in the said tank.

The valve 12 is preferably made as a diaphragm of rubber or other suitable material, and is normally held in engagement with the upper surface of the seat member 13, which constitutes the seat for said valve, by the compression in a coil spring 22, the lower end of which rests against a plate 23 by which the pressure of the spring is distributed evenly over the upper surface of the valve 12 to thereby insure a tight joint between the valve and its seat.

The plate 23 is provided with a relatively short upstanding stem 24 embraced by the lower end of the spring 22. The desired compression in the spring 22 is adjustably secured by an adjusting screw 25, which is screwed through a threaded hole in the top of a valve casing or housing 26, and which bears against a plate 27 positioned upon the top of the coil spring 22 by a depending rod 28 extended down into the spring. The pressure at which the valve 12 will open may therefore be adjusted by means of the screw 25.

The fluid pressure from within the tank 10 is transmitted to the underside of the valve 12 through the hole 18 in the tank body and through a central passage 29 in a stem 30 of the seat member 13, thence through a plurality of branching passages 31 to an annular channel 32 in the seat for the valve 12. When the valve 12 is forced upwardly from its seat by the fluid pressure on its under side, the fluid passes from the annular channel 32 over the intervening portion of the valve seat and into a central opening 33 and thence through a plurality of inclined discharge passages 34 (see dotted lines Fig. 2), leading outwardly to and terminating at the upper portion of an open inverted groove or channel 35 in the lower surface of the seat member 13.

In order to prevent or at least minimize unauthorized tampering with the safety valve and the mechanism for adjusting the pressure for which the valve is set, provision is made for locking the adjusting screw 25 to the valve casing 26 and for locking the valve casing 26 to the seat member 13. For this purpose, after the compression in the coil spring 22 has been adjusted to set the valve for a predetermined pressure in the tank, the adjusting screw 25 is pinned to the valve casing 26 by a pin 36 when the valve is made as shown in Fig. 2.

The threaded hole in the valve casing in which the adjusting screw 25 is received and the hole in the valve casing through which the pin 36 is driven, are both then soldered to conceal the screw and pin.

The valve casing 26 is designed to receive the seat member 13, which latter is provided with external screw threads 37 to engage internal screw threads on the inner surface of the casing, and the latter is made deep enough to permit its lower end 38 to be wiped under the tapered under surface 39 of the seat member 13 and form a means for locking both parts together and practically eliminating the liability of separation of these parts with any of the tools available to the usual persons employed where compressed air tanks and the like are located.

This construction renders access to the coil spring 22 and the adjusting screw 25 a difficult matter and practically impossible from the view point of the man on the job, so that after the safety valve has been assembled by the manufacturer and adjusted for a predetermined pressure, its operation in practice at such pressure is rendered practically certain as far as unauthorized tampering is concerned.

With the ordinary construction of safety valve used in connection with unfired vessels, in the event that the valve becomes defective so as to leak, the natural inclination of the man on the job is to remove the safety valve, plug it up in any one of several ways, and thereafter replace it in operative position in the tanks. From its external appearance there is nothing to indicate that the valve is not acting in a normal manner, so that oftentimes the inspector passing the tank sees the safety valve in place and to all intents and purposes in an operative condition, and therefore in many instances safety valves pass inspection when in fact they are really defective and inoperative.

The present invention also has for its object to eliminate the chance, as far as possible, of the valve being plugged by the man on the job with the tools ordinarily available to him, so that once a leak develops, it is necessary in order to stop the leak, to replace the safety valve with a new or operative safety valve. When therefore an inspector sees one of the present valves in place on a tank, he may be reasonably sure that it is in operative condition if he does not detect leakage from external inspection.

Accordingly the plugging of the discharge passages 34 is practically made impossible by the channel or groove 35, which is of sufficient depth so that the walls thereof prevent the introduction into the inclined discharge passages 34 of straight plugs of any sort.

This construction therefore prevents plugging of the safety valve from the discharge or outlet side of the valve.

In addition to this feature, provision is made for rendering difficult the plugging of the inlet side of the safety valve, and to this end the under side of the base of the valve spud 14 is under cut as at 46. One half of the lower end of the valve stem 30 is slabbed off or cut away for the purpose of preventing the end of the valve stem being used to successfully seat against a plate, disk or other body inserted down through the hole in the valve spud, to close the opening or hole 18 in the tank, if the opening 18 should be smaller than the hole in the spud. If such an attempt is made with the illustrated construction, the pressure of the projecting end 47 of the valve stem will engage the penny or plate or disk at one side of its center and cause the penny, etc. to tip, thus permitting the fluid under pressure within the tank to leak around and into the space or chamber formed by the undercut portion 46 of the base of the valve spud. This space being in direct communication with the central inlet passage 29 through the valve stem permits the fluid to pass through the defective valve and escape through the discharge passages 34.

In order to prevent the plugging or soldering up of the lower end of the inlet passage 29 from successfully plugging the entire safety valve, a radial port or hole 48 is provided in the lower externally threaded end portion of the valve stem, which port extends from one of the threads in the valve stem to the central inlet passage 29 as shown in Fig. 2. The wall of the valve spud is also provided with a plurality of axially arranged slots 49, which are extended vertically a sufficient distance to enable the fluid pressure, in the event that the lower end of the central inlet passage is plugged, to by-pass through the slots 49, through the threads in the valve spud and thence through the radial port or hole 48 into the central inlet passage 29, from which the fluid will escape through the defective valve and issue from the discharge passages 34, thus warning the inspector that the valve is defective.

When the improved safety valve is installed in the pressure tank, it is desirable that the opening or hole 18 in the tank be made square. This would operate as an additional obstacle to the successful plugging of the hole by a coin or plate passed down through the hole in the spud, in those cases where the size of the hole in the spud and the hole in the tank were substantially the same.

In addition to eliminating as far as possible the chance of the workman plugging the inlet or outlet passages of the valve, and then using the valve as a solid plug, it is desirable that the spud 14 itself should be of such construction as to negative the use of a plug having an ordinary thread in the spud.

Accordingly the threads upon the interior of the spud and the threads on the lower end of the stem 30 are made special, being other than a standard pipe thread.

In order to prevent an ordinary leather or other washer being used on the threaded portion of the stem 30 to form a tight joint with the upper surface of the spud, the latter is provided with a valve seat 50 below its upper edge, with which co-operates a valve 51 on the valve stem 30. The portion of the spud above the valve seat 50 is provided with slots 52 so as to prevent closure of the spud by a washer mounted on the valve stem 30 below the valve 51 thereon. In such case, the valve 51 on the valve stem 30 will be raised off of its seat 50, and a free passage afforded from the tank through the threads of the valve stem and through the slots 52 into the atmosphere.

In the normal operation of the safety valve, the valve 51 on the stem 30 is seated on its seat 50 in the spud and a tight joint is obtained within the spud.

The diaphragm valve 12 when made of non-metallic material may be protected against injury by a metal ring 53 interposed between the valve casing 26 and the upper surface of the diaphragm valve.

One embodiment of the invention is herein shown, but it is not desired to limit the invention to the particular construction shown.

Claims:

1. In a safety valve, in combination, a valve seat, a valve cooperating therewith, a spring for normally holding the valve upon its seat, a valve casing enclosing the valve, valve seat and spring, a screw for adjusting the said spring, and a pin within said casing inaccessible for removal from the exterior of the casing and engaging said screw for locking the screw to the valve casing and thereby permanently locking the spring in its adjusted position.

2. In a safety valve, in combination, a valve casing having an opening at one end thereof, a seat member for said valve screwed into said opening and normally closing the same, a valve within the casing co-operating with said seat member, means within the valve casing for determining the pressure at which the valve opens, said casing having a portion bent under the said seat member to lock it from being unscrewed from said casing.

3. In a safety valve, in combination, a valve casing, a valve within the said casing, a seat member for said valve, a spud adapted to be secured upon a fluid pressure tank, and means for securing a tight joint between the said seat member and spud, comprising a valve seat within the spud and below its upper end and an auxiliary valve on the stem of said seat member.

4. A safety valve having in combination a valve stem, a valve spud adapted to be secured upon a fluid pressure tank, a notch in the upper end portion of the spud, and means for securing a tight joint between the valve stem and spud including a valve seat within the spud and below the notch therein, and an auxiliary valve member on the said stem co-operating therewith.

5. In a safety valve, in combination, a valve casing, a valve within said casing, a seat member for said valve, a spring within said casing for normally holding said valve to its seat, and means on said casing extended under and engaged with said seat member for mechanically locking the said seat member to said casing.

6. In a safety valve, in combination, a valve casing, a valve within said casing, a seat member for said valve having a head engaged with said casing and a stem extended from said head outside of said casing, a pressure inlet passage in said stem extended to the seat for said valve, an inclined pressure outlet port extended from said valve seat to the underside of said head, and means for locking said seat member to said casing.

7. In a safety valve, in combination, a valve casing, a valve within said casing, a seat member for said valve having a head engaged with said casing and a stem extended from said head outside of said casing, a pressure inlet passage in said stem extended to the seat for said valve, an annular channel in the under side of said head, and an inclined pressure outlet passage extended from near the botom of said channel to said valve seat.

8. In a safety valve, in combination, a valve casing, a valve within said casing, a seat member for said valve connected with said casing and having a stem extended outside of said casing, a valve on said stem, a spud having a valve seat with which the valve on said stem co-operates, and means for connecting said valve stem with said spud.

9. In a safety valve, in combination, a valve casing, a valve within said casing, a seat member for said valve connected with said casing and having a stem extended outside of said casing and provided with a longitudinally extended pressure passage and with external screw-threads and having a pressure passage extended from said threaded portion to said longitudinally extended pressure passage.

10. The combination with a spud having a pressure outlet port in its upper end, and provided on its inner surface below said outlet port with a valve seat and with screw-threads, of a safety valve having a stem provided with a longitudinally extended pressure passage and with screw-threads to engage the screw-threads of said spud and with a valve to engage the seat within said spud.

11. The combination with a spud having screw-threads on its inner surface and an axially extended port formed in said screw-threads and extended but partially the length of the spud, of a safety valve having a stem provided with a longitudinally extended pressure passage and with screw-threads to engage the screw threads of said spud and having a port extended from the longitudinal pressure passage to the screw-threads thereof to establish communication between the longitudinal pressure passage in the valve stem with the axially extended port in the spud.

12. The combination with a spud having internal screw-threads, of a safety valve having a valve stem provided with an axially extended pressure passage and with a valve and screw-threads to co-operate with the valve and screw-threads of the said spud, and having its end cut away to form a port extended laterally from the axially extended pressure port to the outer surface of the valve stem.

In testimony whereof, I have signed my name to this specification.

ALVIN W. PUFFER.